Dec. 21, 1926. 1,611,434
T. H. GRAHAM
CONTROLLER FOR HYDRAULIC BRAKES
Filed Dec. 24, 1925
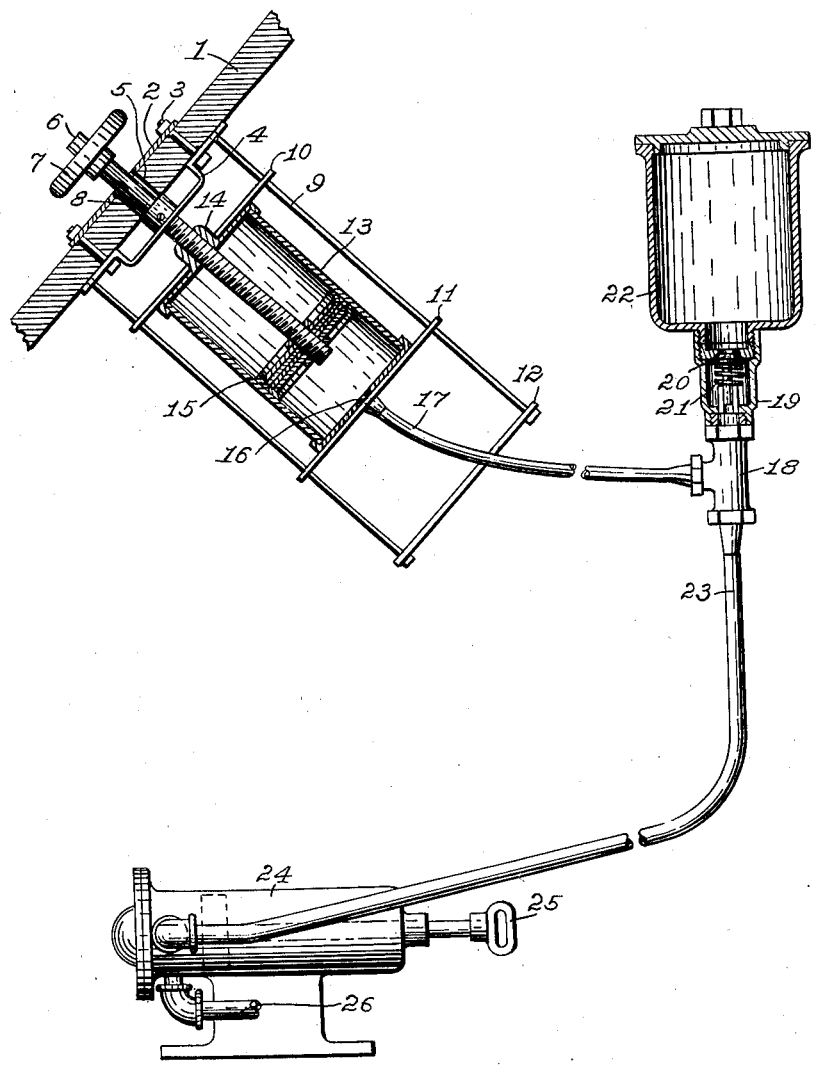
Inventor
Thomas H. Graham
By
Attorney Patented Dec. 21, 1926.

1,611,434

UNITED STATES PATENT OFFICE.

THOMAS H. GRAHAM, OF WATERLOO, IOWA.

CONTROLLER FOR HYDRAULIC BRAKES.

Application filed December 24, 1925. Serial No. 77,635.

My invention relates to improvements in controllers for hydraulic brakes or the like, and the object of my improvement is to provide an auxiliary device for manual operation in the controlling of the liquid supply of such apparatus, whereby the latter may function perfectly continuously.

This object I have accomplished by the means which are hereinafter described and claimed, and which are illustrated in the accompanying drawing, which is a diagrammatic assemblage of my controller, the reservoir and a master cylinder, the two former in longitudinal central section, and the latter in side elevation, with parts broken away.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed, without departing from the spirit of the invention.

In hydraulic brake apparatus, the mobile liquid used therein will in time waste and diminish to a degree which greatly affects the operativeness of the device, as will be understood when the nature of such mechanism is considered, where the motive power is transmitted by liquid pressure, and where any diminution of the pressure or slackness in the power appliances will render the response slower and prevent an effective gripping by the brakes upon the rotary or other elements to be controlled.

Particularly is this important in a hydraulic brake applied to the carrying-wheels of motor cars, where implicit confidence must be reposed in the exact and effective operation of the brakes to avoid injuries to person or property.

My improvement is therefore designed and supplied to permit of easily controlling the supply of the liquid in the system, to replenish it in counteracting wastage, and to thus keep up the efficiency of the brakes to the highest point so far as the application thereto of constant motive power is concerned.

The numeral 24 denotes a master motor employing a liquid, such as oil, for transmission of power hydraulically by way of a delivery conduit 26 to a brake mechanism not shown, the piston of said motor having a protruding stem 25 for actuation by any suitable connection therefor. The motor has a supply conduit or hose 23 leading from the lower end of a T-coupling 18 whose upper end is in valve-controlled communication with a reservoir 22 as follows. The base of the reservoir communicates with a valve-chamber 19 beneath and the latter communicates with said T-coupling 18. The valve-chamber 19 has a valve-seat controlled from below by a valve-head 20, and a small coiled compression-spring 21 engages said valve-head tending to normally keep it closed.

The T-coupling 18 by means of a flexible hose section 17 communicates with the lower end of a cylinder 13. This cylinder is mounted on the vehicle dashboard 1 in the following manner.

A small face-plate 2 is bolted at 3 upon the upper face of the dashboard and has an aperture alined with an aperture 5 in the dashboard. On the under face of the dashboard a shallowly looped plate 4 is secured to it by the same bolts, its spaced middle part having an aperture alined with said apertures in the plate 2 and the dashboard at 5.

A rotatable shaft 6 is seated to traverse these alined apertures, and has a collar 8 fastened rigidly thereon between the plate 4 and the dashboard which prevents longitudinal movements of the shaft, while not interfering with its rotation. Upon the upper end of the shaft 6 near the dashboard is fixed a small hand-wheel 7. The shaft 6 is threaded from a place just below the plate 4 as far as or nearly so as its lower end, and a piston 15, imperforate, is adjustably mounted upon the shaft near its lower end, the piston having reversely cupped flexible parts between rigid plates, and thus closely fitting the interior of the cylinder 13. The upper head of the cylinder 13 is rigid with a square plate 10 welded thereon, and the lower head of the cylinder is similarly mounted upon another square plate 11. At each corner said plates have alined holes through which four smooth rods 9 are loosely passed to permit the plates 10 and 11 to be, together with said cylinder 13, slidingly moved to and fro therealong. The upper ends of the rods 9 are fixed as by welding or otherwise to the plate 4 and dashboard 1 rigidly, while their lower ends are passed through similar holes in a plate 12 and secured thereto. It will be seen that the cylinder 13 is bracketed for to and fro movements upon said rods 9. The upper cylinder-head has a hollow interiorly threaded central boss 14 projecting through a central aperture in the plate 10, and the shaft 6 has its thread meshed with the thread of said boss.

The master cylinder or motor 24 is actuated in the usual manner in setting brakes or other devices to which it may be operatively connected hydraulically, and uses a liquid, oil preferably, as needed supplied from the reservoir 22. In case of wastage of the oil, reducing the necessary amount for effective operation of the brakes, my improved device may be employed to force more oil into the motor and its connections to the brakes as follows.

The operator turns the hand-wheel 7 to rotate the shaft 6 in a direction to cause the cylinder 13 to move downwardly, but the piston 15 remains in one position nevertheless, because the shaft cannot advance longitudinally. This movement of the cylinder 13 increases the interior space between the piston and the bottom of the cylinder creating a partial vacuum, hence as this vacuum is also induced in the hose 17 and under the valve 20 in the valve-chamber 19, the valve opens and a supply of oil is drawn from the reservoir 22 into the lower part of said cylinder 13. The hand-wheel 7 is then rotated reversely, to cause the cylinder 13 to move in an opposite direction, whereby oil is expelled from the lower part of the cylinder into the hose parts 17 and 23 and thus to the motor cylinder 24 to keep up the supply therefor.

The slidable mounting of the cylinder 13 permits the hand-wheel 7 to remain in one position near the dashboard 1, and not projecting upwardly inconveniently as would be the case were the piston and said shaft movable through a fixed cylinder. The controller shown operates quickly and effectively for normal action.

The movement of the cylinder 13 along the piston 15 in one direction while creating a vacuum in the lower part of the cylinder to draw a supply of oil from the reservoir 22 also may draw up into the cylinder some oil from the conduit 23, but this does not affect the operativeness of the device, because the return movement of the cylinder 13 forces such oil back through said conduit to keep up the proper supply in the cylinder 24 and the conduits leading to the brakes. In fact, the first movement of the parts as above described is important as one of the controlling functions of the device, because the operator may by this movement as related to a return movement finely graduate the pressure in the cylinder 24, that is in both relieving excess pressure therein as also in adding to the pressure. The device therefore is made quickly responsive in action on the brakes with a minimum adjustment of travel on turning the hand-wheel 7 appropriately.

Having described my invention, what I claim as new, and desire to secure by Letters Patent, is:

1. In an apparatus of the class described, the combination with a reservoir having a valve-controlled delivery port, and a hydraulic device including means of communication with said valve-controlled port, of a closed cylinder having a port in one end and an interiorly-threaded aperture in the other, a flexible conduit in communication with said port and with the communication of said hydraulic device with said reservoir, a relatively fixed support, said cylinder being mounted thereon for to and fro movements relative thereto longitudinally, an imperforate piston in said cylinder having a threaded stem meshed in and projecting through said threaded aperture, and means engaged between said stem and said support to prevent longitudinal movements of the stem and piston.

2. In an apparatus of the class described, a hydraulic device for transmitting power hydraulically, a reservoir and means for occasional communication therewith, a reciprocatory cylinder for occasional communication with the communication between said device and reservoir, and a piston in said cylinder supported against longitudinal movements therein.

3. In an apparatus of the class described, a hydraulic device for transmitting power hydraulically, a reservoir having a valve-controlled outlet and means of communication from said outlet to said device, a cylinder mounted for reciprocation and in communication at one end with the communication between said device and said reservoir, a relatively fixed piston in said cylinder having a stem projecting from the other end of the cylinder, and means for rotating said stem operatively connected with the cylinder to propel the cylinder to and fro longitudinally past the fixed piston.

4. In an apparatus of the class described, a hydraulic device for transmitting power to a hydraulic brake, a reservoir having a port, resilient controlling means for closing said port, said device including means of occasional communication with the reservoir by way of said port, a relatively fixed dashboard support, a threaded stem supported on said dashboard for rotation without longitudinal movements, a piston fixed on said stem, means for rotating said stem positioned on the opposite side of the dashboard from said piston cylinder containing said piston and having a threaded aperture in one head traversed by said threaded stem, supporting guides mounted rigidly on said dashboard on which the cylinder is mounted for to and fro longitudinal movements, said cylinder having a port in its other head, and a flexible hose communication between said ported head and the communication between said hydraulic device and said reservoir.

In testimony whereof I affix my signature.

THOMAS H. GRAHAM.